United States Patent [19]
Bisbing

[11] 4,047,266
[45] Sept. 13, 1977

[54] QUICK ACTION FASTENER

[75] Inventor: Robert H. Bisbing, Springfield, Pa.
[73] Assignee: Southco, Inc., Concordville, Pa.
[21] Appl. No.: 666,766
[22] Filed: Mar. 15, 1976
[51] Int. Cl.² .................................................. A44B 17/00
[52] U.S. Cl. .................................. 24/221 R; 24/221 K
[58] Field of Search ............. 24/221 A, 221 K, 221 R

[56] References Cited

U.S. PATENT DOCUMENTS

| | | | |
|---|---|---|---|
| 2,610,379 | 9/1952 | Bugg | 24/221 A |
| 3,136,017 | 6/1964 | Preziosi | 24/221 K |
| 3,673,913 | 7/1972 | Barry | 85/70 |
| 3,744,101 | 7/1973 | Gley | 24/221 K |

Primary Examiner—Bernard A. Gelak
Attorney, Agent, or Firm—Paul & Paul

[57] ABSTRACT

Described is a quick acting fastener which is particularly adapted to securing together structures such as panels having suitable shaped openings to receive a unitary, quarter turn, snap acting fastener having projections which snap into fastening position through relative rotational and axial motion of interacting cam elements mounted on a stud which is rotatable.

3 Claims, 15 Drawing Figures

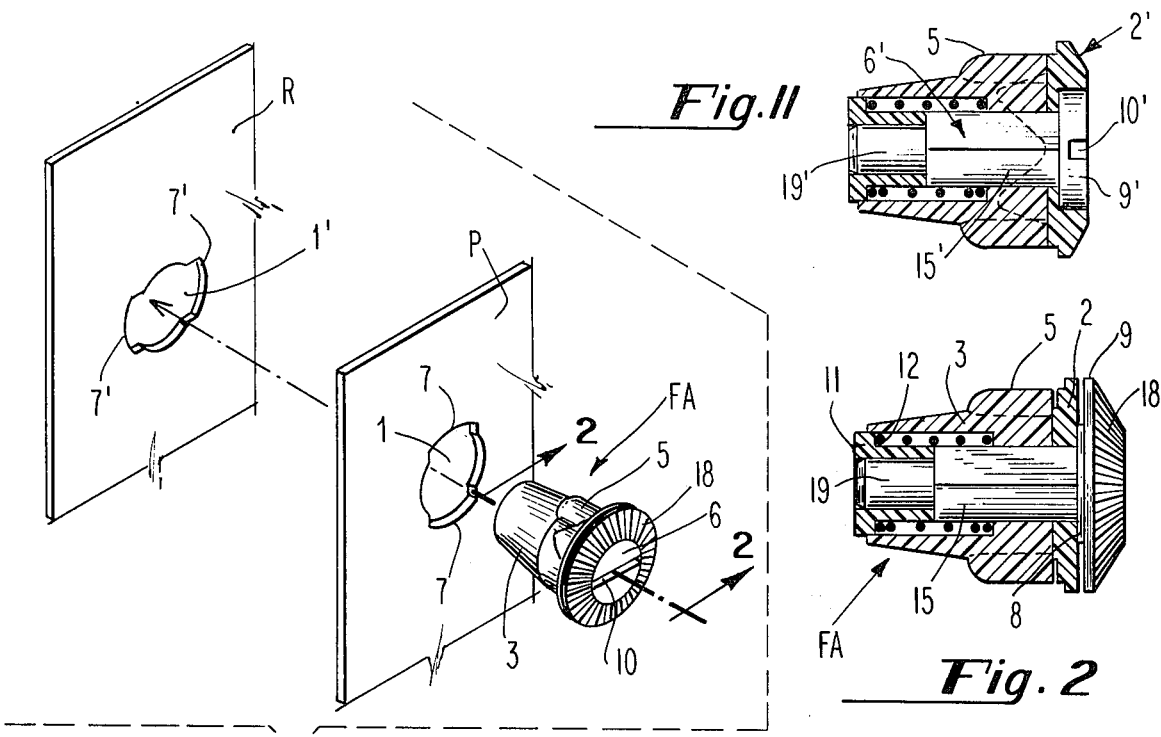
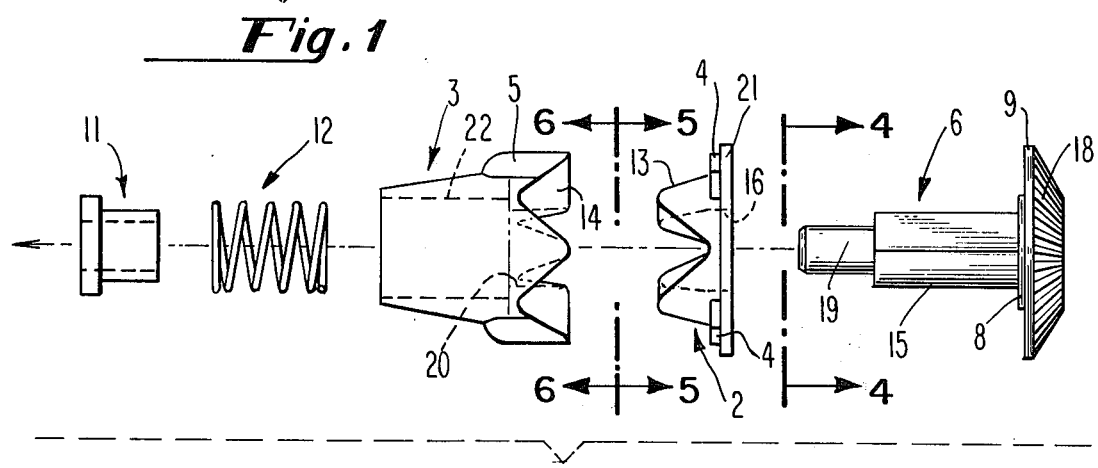
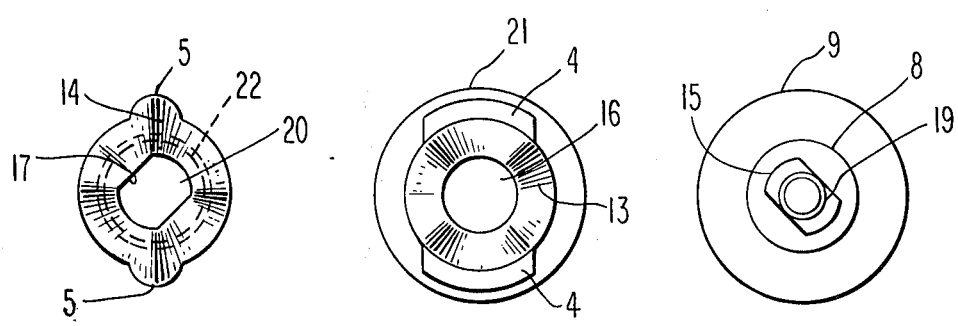

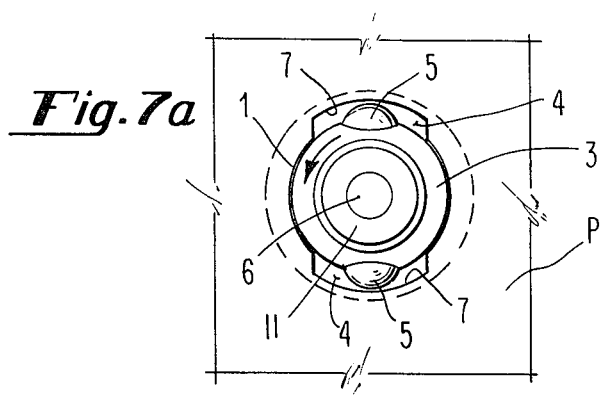
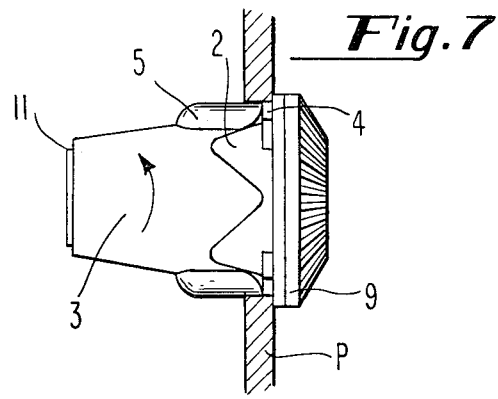
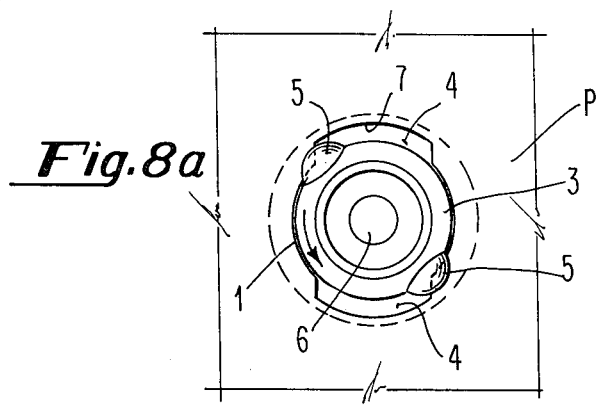
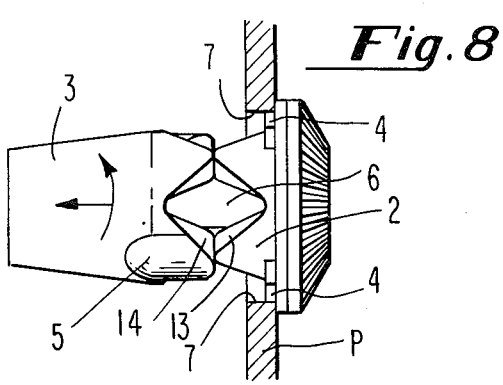
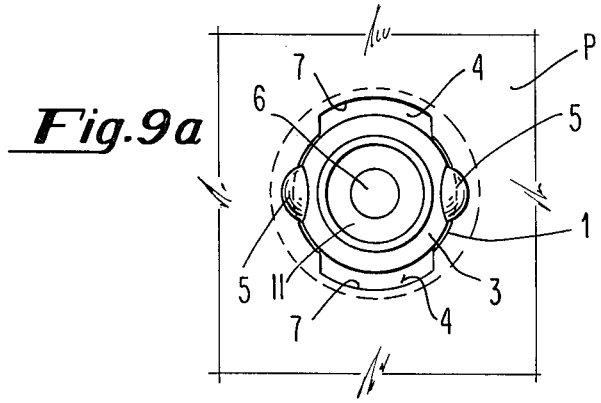
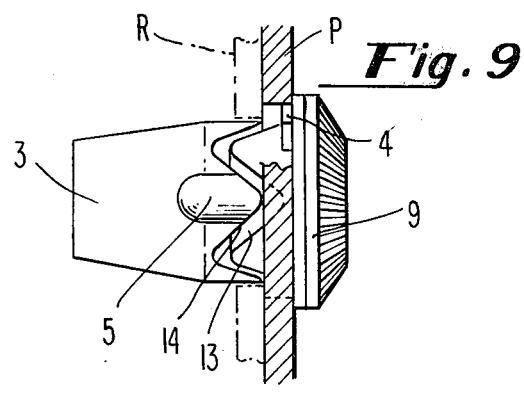
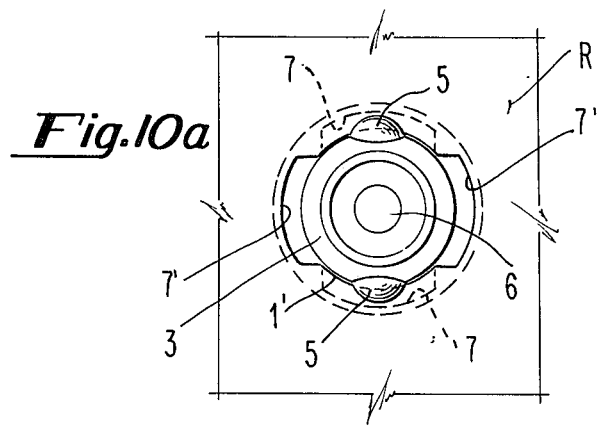
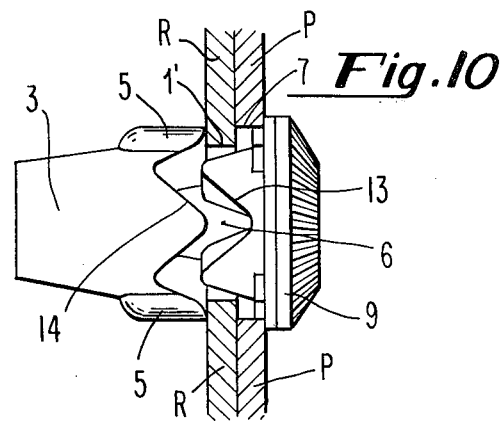

QUICK ACTION FASTENER

BACKGROUND OF THE INVENTION

This invention relates to the field of devices which releasably hold the face surfaces of two rigid sheets or panels in close proximity to one another. Particularly, it relates to a unitary device for use in such fastening applications where it is desirable to fasten two such panels together with a snap action and to unfasten and separate them quickly by rotation of a stud, the head of which is accessible at the outside surface of the panels.

In the prior art, fasteners which have been available to hold two panels together in face to face abutment usually have included one or more components adapted to be attached permanently to one or more of the panels to be fastened together. Fasteners of this type are shown in U.S. Pat. Nos. 2,853,114; 3,244,444; 3,862,773 and 3,204,680. Previous fasteners of the quarter turn type provide a fastening and unfastening action by means of a stud with a shaped end which cooperates with a separate receptacle. However, the stud and receptacle components each require a retainer or attachment means to hold them in position on the respective panels. The installation of such fastening devices requires several operations as well as additional attachment components and this increases the total cost of using such devices. Fasteners of this general type are shown in U.S. Pat. Nos. 1,955,740; 2,575,311 and 3,123,880.

The prior art also includes panel fasteners consisting of a single assembly to be installed in one of the panels and having a stud with radial extensions adapted to engage a shaped hole. In one position of rotation the projections on the inner end of the stud element pass through a cooperating shaped hole in the panel; in another position of rotation the stud projections engage the edge of the shaped hole after passing over detents. To operate this style fastener, the stud element must be pushed inward before it can be rotated past the detent elements that are required. In order to provide for the axial movement of the stud required to clear the detents, the head of the stud must project well above the outer panel surface and this substantial projection is objectionable in many applications.

Also included in the prior art are fasteners incorporating a rotatable stud which operates to compress a resilient sleeve thereby accomplishing a fastening action. A fastener of this type is shown in U.S. Pat. No. 3,673,913.

SUMMARY OF THE INVENTION

It is an object of this invention to provide a unitary quick operating fastener adapted to releasably secure together two rigid sheets or panels in close proximity to one another.

Another object of the invention is to provide such a fastener that is very quick and simple to install and which does not require permanent attachments to either of the panels.

Another object of the invention is to provide a fastener as above which is complete in a single assembly and which does not require an element extending substantially outward from the outer panel surface.

Further objects of the invention include that the fastener assembly (a) be simple to operate, requiring only a fraction of a turn in either direction to fasten or unfasten it, (b) provide a low profile above the outer panel, (c) secures the panels together with a snap action under a biasing force, and (d) be constructed of corrosion-resistant materials.

The above stated objects are accomplished by the unitary structure of the present invention which provide a quarter turn fastener complete in a single assembly consisting of a stud, inner and outer cam components, biasing means in the form of a spring or the like, and retainer means engaging the inner end of the stud to retain the components in operative assembly. The fastener of the preferred embodiment is designed and constructed so as to be installed by inserting the assembly into a shaped hole in a first panel. The outer cam element is provided with projections which engage the shaped hole to prevent rotation of the cam element. The inner cam is keyed to the stud and may be rotated by turning the stud a quarter turn in either direction so that projections formed on the inner cam component are moved axially and rotated to a position of engagement behind the shaped hole to retain the fastener in the first panel. To hold two panels together, the installed fastener is inserted into a shaped hole in the second panel and, again, the stud is rotated a quarter turn in either direction to bring the projections on the inner cam into a position of engagement with the edge of the shaped hole in the second panel.

BRIEF DESCRIPTION OF THE DRAWINGS

FIG. 1 is an exploded perspective view showing the fastener assembly and two panels having shaped openings positioned normal to one another.

FIG. 2 is a cross section of the fastener assembly taken along the line 2—2 of FIG. 1.

FIG. 3 is an exploded side elevation showing the component parts of the fastener assembly of the present invention.

FIG. 4 is an end view taken along line 4—4 of FIG. 3.

FIG. 5 is an end view taken along the line 5—5 of FIG. 3.

FIG. 6 is an end view taken along the line 6—6 of FIG. 3.

FIG. 7 is a side view of the fastener assembly inserted into a panel opening but not attached to the panel.

FIG. 7a is a left end view of FIG. 7.

FIG. 8 is a side view of the fastener of FIG. 7 shown with the inner cam rotated to a maximum camming position.

FIG. 8a is a left end view of FIG. 8.

FIG. 9 is a side view showing the fastener after rotation of the inner cam beyond maximum camming and affixed to a panel.

FIG. 9a is a left end view of FIG. 9.

FIG. 10 is a side view showing the fastener securing together two panels.

FIG. 10a is a left end view of FIG. 10. FIG. 11 is a cross section of an alternative form of the fastener assembly of the present invention.

DETAILED DESCRIPTION OF THE PREFERRED EMBODIMENT

Referring to FIGS. 2 and 3, the preferred embodiment of the present invention is seen as comprising five main components adapted to being operatively assembled to provide a unitary fastener. These main components include a stud element 6, an outer cam element 2, an inner cam element 3, a biasing element 12 and a retainer 11. Except for biasing element 12, each of the operating elements may be molded or otherwise formed from a suitable plastic material. Stud 6 includes a head 9, a shaped shank portion 15, a reduced inner end shank portion 19 and a reduced area bearing surface 8 which engages the outer surface 21 of outer cam 2 as shown in FIG. 2, thereby reducing frictional torque when stud 6 is rotated. Head 9 is provided with serrations 18 to facilitate rotation of stud 6 and also with a slot 10 for the same purpose.

As shown in FIGS. 3 and 5, outer cam element 2 has a central bore 16 within which the shank 15 of stud 6 is free to turn. Cam element 2 also has hole engagement means 4 in the form of raised surfaces 4 which fit into enlarged diameter portions 7 of shaped hole 1, as shown in FIG. 1, thereby preventing rotation of cam element 2 relative to panel P when cam element 3 is rotated. Cam surfaces 13 are provided for engagement with cam surfaces 14 of inner cam element 3. As shown in FIGS. 3 and 6, inner cam element 3 is provided with a reduced bore portion 20 which is shaped to engage shaped shank portion 15 of stud 6, so that cam element 3 will rotate when stud 6 is turned and at the same time will be free to move axially. Cam element 3 is also provided with projections 5 which serve to engage the inner surfaces of panels P or R on rotation of cam element 3 as hereinafter described. A larger diameter bore 22 is provided toward the inner end of cam element 3 to receive coil spring 12 which is seated against the abutment formed by the smaller diameter shaped bore 20.

As shown in FIG. 2, the end portion of retainer 11 fits within coil spring 12 and fits over reduced inner end 19 of stud 6 where it may be held either by a force fit or by a suitable adhesive. The unitary fastener of the present invention in assembled form is shown at FA in FIGS. 1 and 2.

An alternative form of the present invention is shown in FIG. 11 in which the head 9' of stud 6' is designed for tool operation only and is recessed within the outer end of cam element 2'.

OPERATION OF THE INVENTION

Referring now to FIG. 1, two panels, P and R are shown having shaped openings 1 and 1' respectively. The fastener assembly FA is first inserted into shaped opening 1 of panel P. At the time of insertion, projections 5 on inner cam element 3 and raised surfaces 4 on outer cam element 2 are sufficiently aligned to permit insertion of the fastener assembly into shaped opening 1. Projections 5 are thus cleared through enlarged diameter portions 7 and raised surfaces 4 are fitted into the enlarged diameter portions 7 of shaped hole 1, thereby preventing rotation of cam element 2 relative to panel P. FIGS. 7 and 7a show fastener FA thus inserted into hole 1 of panel P. Stud 6 is now rotated in either direction, thereby imparting a rotational movement to cam element 3 which is moved axially inward by the camming action of moving cam surfaces 14 against fixed cam surfaces 13 of cam element 2. The position reached at the maximum inward axial movement of cam element 3 is shown in FIGS. 8 and 8a. Further rotation of stud 6 causes cam element 3 to take the position shown in FIGS. 9 and 9a in which lateral projections 5 snap into contact with the inner surface of panel P being biased to this position by spring 12 when cam 3 moves beyond the position shown in FIG. 8. Fastener assembly FA will now be firmly attached to panel P. Attachment of panel P to panel R is accomplished by inserting the inward projection of fastener FA into shaped opening 1' in panel R, which opening is oriented at 90° to shaped opening 1 of panel P. The configuration of fastener FA and panels P and R after such insertion is shown in FIG. 9 wherein panel R is shown in phantom in order to indicate that fastener assembly FA is first attached to panel P and then the inward projection of the attached fastener assembly FA is passed through the opening 1' in panel R. Stud 6 is now rotated one-quarter turn in either direction which causes cam element 3 to rotate and move axially first in and then out as before bringing the assembly to the fastener condition shown in FIGS. 10 and 10a with projections 5 now being biased by spring 12 into contact with the inner surface of panel R, thus providing a firm attachment of panel P to panel R.

Having thus described my invention by reference to preferred embodiments thereof as illustrated herein, I claim:

1. A quarter turn unitary snap fastener adapted for securing overlying outer and inner panels having coaxial and essentially orthogonal non-circular holes formed therein, comprising a rotatable stud having a head and a shank, said shank having a non-circular cross section over at least a portion of the length of said stud, an outer cam element having an axial bore positioned over said shank with said shank free to rotate within said bore, said outer cam element comprising a flange adapted to engage the outer surface of the outer panel, inwardly extending cam surfaces integral with said flange adapted to be inserted through the holes formed in the outer and inner panels, a raised surface integral with the inner surface of said flange and adapted for engagement with the non-circular hole in the outer panel on insertion of the cam elements through said hole, thereby preventing rotation of said outer cam element relative to said panel, an inner cam element having an axial bore at least a portion of which is non-circular in cross section and which engages the non-circular portion of said shank and is adapted to rotate therewith while being free to move axially relative thereto and having outwardly extending cam surfaces adapted to engage the cam surfaces of said outer cam element thereby forming an enclosure for said stud, at least two projections integral with said inner cam element and extending radially a distance greater than the smaller diameter of the non-circular holes in said panels and less than the larger diameter of said holes, biasing means positioned to engage said inner cam element and urging said inner cam element toward the outer cam element, whereby said inner cam element is rotated and moved axially inward on rotation of said stud while said outer cam element is held in fixed position relative to said outer panel.

2. The snap fastener of claim 1 in which the inwardly extending cam surfaces and the outwardly extending cam surfaces normally engage to form a continuous body enclosing the rotatable stud.

3. The snap fastener of claim 2 in which the inner cam element is provided with an inwardly extending body member having a bore adapted to receive and enclose said biasing means.

* * * * *